United States Patent [19]

Piepenstock

[11] Patent Number: 5,651,480
[45] Date of Patent: Jul. 29, 1997

[54] HELICAL COMPRESSION SPRING

[76] Inventor: Friedhelm Piepenstock, Bahnhofstrasse 27, D-99842 Ruhla, Germany

[21] Appl. No.: 557,464

[22] Filed: Nov. 14, 1995

[30] Foreign Application Priority Data

Sep. 12, 1995 [DE] Germany .......................... 295 14 644.3

[51] Int. Cl.$^6$ ............................................. G01F 11/02
[52] U.S. Cl. ............................................ 222/341; 222/321.9
[58] Field of Search .................................. 222/340, 341, 222/321.9, 321.7

[56] References Cited

U.S. PATENT DOCUMENTS

| | | | |
|---|---|---|---|
| 2,521,961 | 9/1950 | Bacheller | 222/341 X |
| 4,325,501 | 4/1982 | Shay | 222/340 X |
| 4,512,501 | 4/1985 | Foster | 222/321.9 X |
| 5,307,962 | 5/1994 | Lin | 222/321.9 |
| 5,553,757 | 9/1996 | Wang | 222/321.9 |

*Primary Examiner*—John Rivell
*Attorney, Agent, or Firm*—Edwin D. Schindler

[57] ABSTRACT

Helical compression spring designed as a thermoplastic molding and having an end collar on the valve-seat side and an end collar on the actuating side. The technical problem is to provide a helical compression spring having a valve closure member which can move unhindered and is of corrosion-proof design. The end collar on the valve-seat side accommodates a valve closure cap which is made of a thermoplastic and whose tappet is guided so as to be movable in the axial direction of the helical compression spring.

5 Claims, 1 Drawing Sheet

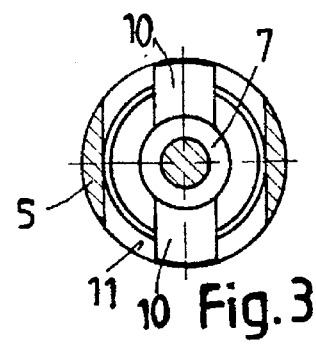
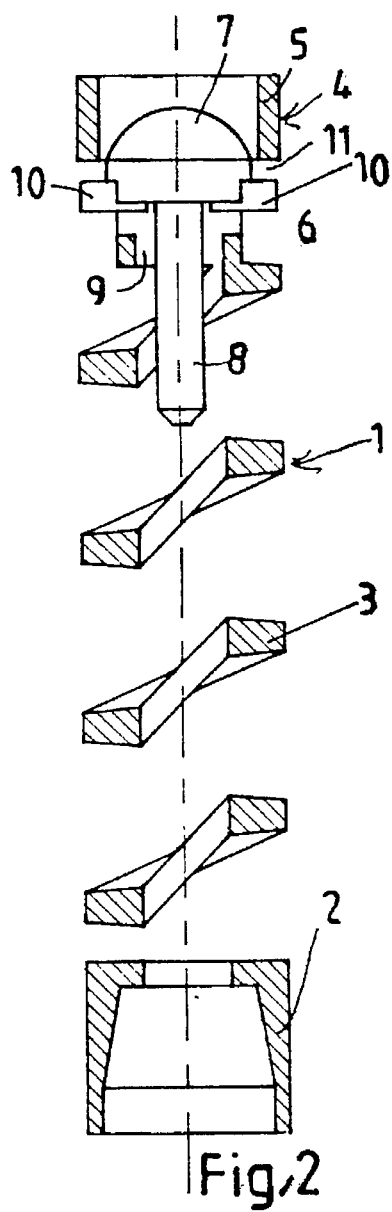
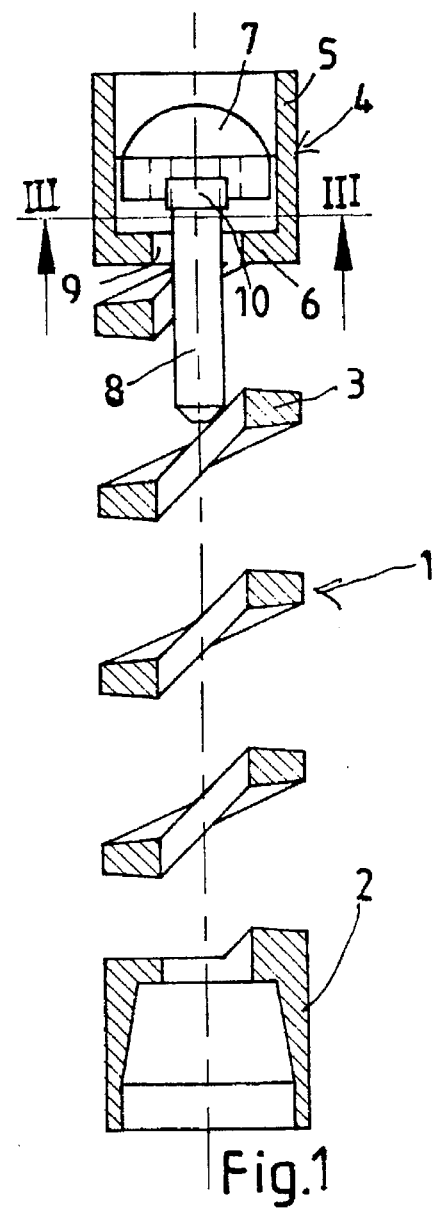

HELICAL COMPRESSION SPRING

BACKGROUND OF THE INVENTION

1. Field of the Invention

The invention relates to a helical compression spring designed as a thermoplastic molding and having an end collar on the valve-seat side and an end collar on the actuating side.

Such a helical compression spring is used in pumps for hygienic and cosmetic preparations, such as pump sprays.

Upon actuation of a plunger, the helical compression spring is loaded and the preparation is forced out or sprayed. As a result, a valve closure member held in the end collar on the valve-seat side is pressed onto the valve seat to prevent the preparation from flowing back. The valve closure member is normally a steel ball. Even if high-grade steel balls are used, corrosion due to the strongly basic preparations cannot be ruled out. In particular, discoloration may occur.

2. Description of the Prior Art

DE 295 04 817 U describes a helical compression spring at whose end on the valve-seat side a valve closure cap is molded on. The molded-on part is admittedly designed to be movable. However, it inhibits and hinders the movement of the valve closure member.

SUMMARY OF THE INVENTION

The object of the invention is to provide a helical compression spring having a valve closure member which can move unhindered and is of corrosion-proof design.

This object is achieved according to the invention by virtue of the fact that the end collar on the valve-seat side accommodates a valve closure cap which is made of a thermoplastic and whose tappet is guided so as to be movable in the axial direction of the helical compression spring.

The invention differs from the prior art insofar as the valve closure cap made of thermoplastic is accommodated in the helical compression spring. This allows simplified production and assembly of the pump. The valve closure cap is absolutely corrosion-proof. The valve closure cap can thus be recycled along with the helical compression spring.

Secure axial guidance of the valve closure member is obtained by virtue of the fact that the tappet passes through an opening in the end collar on the valve-seat side.

Simplified mounting is ensured by virtue of the fact that, for captive retention of the valve closure cap, radially directed webs engage in axial guide slots of the end collar on the valve-seat side.

Production in one injection molding cycle is made possible by virtue of the fact that the valve closure cap is integrally molded with the helical compression spring by injection molding and is detached during demolding.

BRIEF DESCRIPTION OF THE DRAWINGS

An embodiment of the invention is explained with reference to the drawing, in which:

FIG. 1 shows a helical compression spring partly in section,

FIG. 2 shows a section relating to FIG. 1 and

FIG. 3 shows a section along the line III—III in FIG. 1.

DESCRIPTION OF THE PREFERRED EMBODIMENT

The helical compression spring 1 is a thermoplastic molding produced by injection molding. The helical compression spring 1 comprises an end collar 2 on the actuating side, a flight 3 and a cup-shaped end collar 4 on the valve-seat side, having an annular wall 5 and a cup base 6. A plunger or plunger projection (not shown) of the pump engages in the end collar 2 on the actuating side.

The end collar 4 on the valve-seat side cooperates with a valve seat on an outlet nozzle of the reservoir. A valve closure cap 7 having a tappet 8 is provided as valve closure member for the valve seat. The tappet 8 reaches through an opening 9 in the cup base 6 and into the hollow core of the helical compression spring 1.

Two diametrically opposite radial webs 10 which reach into axial guide slots 11 of the annular wall 5 are preferably molded onto the valve closure cap 7. As a result, the valve closure member is held and guided in the end collar 4 in a captive but easy-moving manner.

The valve closure member is integrally molded with the helical compression spring 1 in one injection molding cycle. During demolding, the sprue for the valve closure member is separated, so that the latter is then held freely movably in the end collar 4 in the alignment shown.

The entire helical compression spring 1 with valve closure member consists of a thermoplastic material. Said material is corrosion-proof against all types of cosmetic and hygienic preparations, so that these can be handled without problems. The helical compression spring or entire pump is completely recyclable, since the valve closure member consists of the same material as the helical compression spring.

Owing to its free axial mobility, the valve closure cap closes off the valve seat immediately on actuation of the plunger. The functioning of the pump is thereby improved.

We claim the following:

1. A helical compression spring designed as a thermoplastic molding and having an end collar on the valve-seat side and an end collar on the actuating side, wherein the end collar on the valve-seat side accommodates a valve closure cap which is made of a thermoplastic and a tappet is guided so as to be movable in the axial direction of the helical compression spring.

2. The helical compression spring as claimed in claim 1, wherein the tappet passes through an opening in the end collar on the valve-seat side.

3. The helical compression spring as claimed in claim 2, wherein the opening is provided in a cup base of the end collar.

4. The helical compression spring as claimed in claim 1, wherein, for captive retention of the valve closure cap, radially directed webs engage in axial guide slots of the end collar on the valve-seat side.

5. The helical compression spring as claimed in claim 4, wherein the valve closure cap is integrally molded with the helical compression spring by injection molding and is detached during demolding.

* * * * *